United States Patent
Sandstrom et al.

[11] Patent Number: 5,619,602
[45] Date of Patent: Apr. 8, 1997

[54] FIBRE

[75] Inventors: Ulf Sandstrom, Styrso; Sven-Olov Roos, Lerum; Kennet Vilhelmsson, Partille, all of Sweden

[73] Assignees: Permanova Laser System AB, Ostersund, Sweden; Rofin-Sinar Laser GmbH, Hamburg, Germany

[21] Appl. No.: 551,410

[22] Filed: Nov. 1, 1995

Related U.S. Application Data

[63] Continuation of Ser. No. 219,837, Mar. 30, 1994, abandoned.

[30] Foreign Application Priority Data

Apr. 1, 1993 [SE] Sweden ................... 9301100

[51] Int. Cl.⁶ ............................................. G02B 6/26
[52] U.S. Cl. ................... 385/31; 385/38; 385/34; 385/140; 385/126
[58] Field of Search ................... 385/31, 34, 43, 385/77, 78, 84, 92, 93, 139, 38, 140, 126

[56] References Cited

U.S. PATENT DOCUMENTS

| | | |
|---|---|---|
| 3,843,865 | 10/1974 | Nath ........................ 350/227 |
| 4,257,671 | 3/1981 | Barbaudy et al. ........... 385/140 |
| 4,261,640 | 4/1981 | Stankos et al. ............. 385/140 |
| 4,575,181 | 3/1986 | Ishikawa ..................... 385/31 |
| 4,678,273 | 7/1987 | Vilhelmsson ............... 350/96.3 |
| 4,753,511 | 6/1988 | Bowers et al. .............. 385/140 |
| 5,179,610 | 1/1993 | Milburn et al. ............. 385/92 |
| 5,243,681 | 9/1993 | Bowen et al. .............. 385/140 |

FOREIGN PATENT DOCUMENTS

| | | | |
|---|---|---|---|
| 0483477 | 8/1991 | European Pat. Off. . | |
| 59-3408 | 1/1984 | Japan ................... | 385/34 |
| 2-281210 | 11/1990 | Japan ................... | 385/34 |
| 9217732 | 10/1992 | WIPO . | |

*Primary Examiner*—John Ngo
*Attorney, Agent, or Firm*—Pollock, Vande Sande & Priddy

[57] ABSTRACT

An optical fiber cable for high power laser radiation transmission comprises a fiber having a core and a surrounding cladding, a rod provided at at least one of contact ends of the core and fused to an end surface of the core the rod having larger diameter than that of the core, and a reflector provided at this end of the fiber, the rod being designed to conduct rays entering outside the fiber towards an area where they can be absorbed without causing any damage, to conduct rays not linked into the fiber towards the reflector.

11 Claims, 1 Drawing Sheet

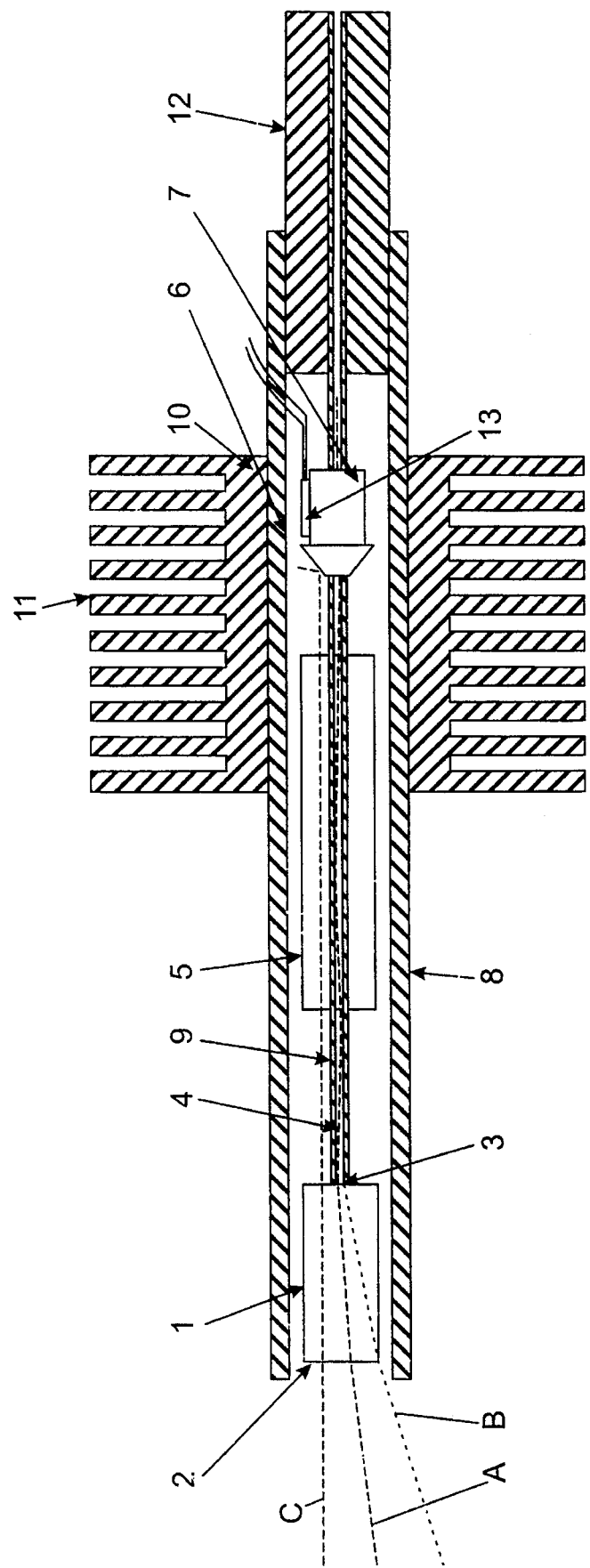

FIBRE

This application is a Continuation of U.S. patent application Ser. No. 08/219,837, filed Mar. 30, 1994, now abandoned.

FIELD OF THE INVENTION

The present invention relates to an optical fiber cable which comprises a fiber having a core and a surrounding cladding and which is suitable for transmitting high-power laser light. At least one of the contact ends of the fiber has means for deflecting light outside the core towards an area where it can be absorbed without causing any damage. The invention also concerns the use of such a fiber.

BACKGROUND OF THE INVENTION

Normally, an optical fiber cable includes a fiber which consists of a core and a surrounding cladding. To facilitate handling, the cladding should be surrounded by a protective covering. The radiation is conduct ed in the core, whose refractive index differs from that of the cladding. In a step index optical fiber, total internal reflection in the interface is achieved as long as the angle of incidence of the radiation does not exceed a critical angle referred to as the numerical aperture of the fiber. In a graded index optical fiber, the refractive index of the core is distributed, mostly as a parabolic function, and the numerical aperture depends on where the ray impinges upon the end surface. The highest numerical aperture is attained at the centre of the fiber, and this value is indicated in the fiber specification. In all cases, the cladding should be substantially free from radiation. Normally, the refractive index of the core is higher than that of the cladding, and the numerical aperture is determined by this difference in refractive index.

In the transmission of high-power laser light, radiation in the cladding may cause serious problems, since it is eventually absorbed in the covering, resulting in considerable heat generation and damage to the fiber cable. Radiation in the cladding may, for instance, arise as a result of light scattering in the end surface of the fiber, for example caused by scratches or dust particles, or as a result of some of the incident radiation quite simply falling outside the numerical aperture, of the fiber. These problems are most severe at the inlet and outlet ends of the fiber cable, where the reflection of incoming and going radiation, as well as the absorption of dust particles and the like, gives rise to harmful heat generation. At the outlet end, radiation can be reflected from the workpiece directly into the cladding or fall completely outside the fiber. In both cases, the radiation is finally absorbed in the covering and heat is generated.

U.S. Pat. No. 4,678,273 (corresponding to SE Patent 443,454) discloses an optical fiber surrounded by a radiation-proof transmitting material which conducts radiation away from the cladding.

U.S. Pat. No. 3,843,865 discloses an optical fiber having a core without a cladding, the diameter of the core increasing towards the end surfaces. The problem of radiation that is not linked into the core is not touched upon. Also, the fiber is apparently not suited for powers above 200 W, which is not enough for modern materials-processing techniques using laser.

SUMMARY OF THE INVENTION

The present invention aims at providing an optical fiber cable that can be used for transmitting high-power laser light, preferably up to 3 kW, or even higher, without causing any damage to the fiber or its covering.

According to this invention an optical fiber cable comprises a fiber which has a core and a surrounding cladding. At least one of the contact ends of the core is provided with a rod whose diameter is larger than that of the core, preferably larger than the outer diameter of the cladding. At this end, the fiber is further provided with a reflector designed to conduct rays entering outside the fiber, to an area where they can be absorbed without causing any damage, the rod being so designed that rays not linked into the fiber are conducted towards the reflector. This area may be provided with means for cooling off the heat generated upon absorption, such as air cooling or water cooling means 3. The fiber may be a step or graded index optical fiber.

Since the rod at the contact end of the core has a diameter larger than the core, power density is reduced, which increases the tolerance towards particles, scratches and other defects on the end surface. Another advantage is that the rod helps to maintain the core end in the correct position in the fiber contact, thereby reducing the need for other fixing devices. The rod may also be provided with a suitable anti-reflex coating on the short side, which cannot be easily done with the thin fiber core. Conveniently the rod is made of a material having essentially the same refractive index as the core and should be in good optical contact therewith, for example by the rod and the core being fused together. Suitably, the rod and the core are made of the same material, preferably glass, in particular quartz glees. Although the rod and the fiber core can be made from The same piece, it is easier to impart the desired shape to the rod if this is applied afterwards by being fused together with the fiber core. Preferably, the rod is substantially cylindrical, so that the short side attached to the fiber core constitutes a plane substantially perpendicular to the extent thereof. As a result, most of the light rays that are not linked into the fiber are conducted towards the reflector to be reflected towards the area where they can be absorbed under controlled conditions, for example by this area including cooling means. Also other designs of the rod are conceivable, provided they permit checking or controlling where rays outside the fiber go.

In a preferred embodiment, the reflector is partly absorbing, and a temperature sensor is provided in the vicinity thereof. This makes it possible to rapidly obtain a warning signal, should radiation power outside the fiber be too high. Suitably, from about 80% to about 99% of the incident radiation is reflected, preferably from about 85% to about 99%, while the remainder is absorbed.

To replace or supplement a temperature sensor, an optical detector can be provided for measuring the radiation outside the cladding. The optical detector may, for instance, be adapted to measure radiation impinging upon the reflector or radiation reflected from the area where the radiation from the reflector is conducted.

Preferably, the fiber is also provided with a radiation proof transmitting material having a refractive index which is higher than, or substantially equal to, that of the cladding and which is arranged so that it surrounds and is in optical contact with the cladding in a part of the area between the reflector and the rod at the contact end of the core. As a result, any radiation in the cladding is linked out to the radiation-proof transmitting material, and it is conducted to the area where is can be absorbed under controlled conditions, optionally via the reflector.

Preferably, both the inlet end and the outlet end of the optical fiber cable are designed as described above. The invention also concerns a method for transmitting light, especially laser light, preferably of a power exceeding about 500 W, and especially exceeding about 1000 W, by using an optical fiber cable according to the invention.

Compared with prior-art optical fiber cables, the inventive cable has a higher resistance to radiation that is not linked directly into the core, both radiation that has come out into the cladding and radiation that falls completely outside the fiber. This is especially advantageous at the outlet end of the fiber cable, where reflection from the workplace may give rise to uncontrolled scattering of light, involving considerable risks of damage. Monitoring possibilities have been improved, in that a temperature sensor can be positioned where the temperature first increases at high powers. The large cross-sectional area and the possibility of anti-reflex coating at the inlet and the outlet ends of the fibers entail that power resistance is higher and reflection losses lower than in conventional fibers.

BRIEF DESCRIPTION OF THE DRAWINGS

The present invention will now be described in more detail with reference to the accompanying drawing, which is a schematic lateral section of an optical fiber cable at one of its contact ends.

DETAILED DESCRIPTION OF THE PREFERRED EMBODIMENT

In the drawing, one end of an optical fiber is arranged in a fiber contact 8, made for example of aluminium. The optical fiber consists of a core 4, for example of quartz glaze, and a cladding 9, which is made of a material having a lower refractive index than the core 4. For instance, the cladding 9 can be made of glass or some polymer of suitable refractive index. A cylindrical rod 1, whose diameter is larger than the outer diameter of the cladding 9, is fused to the end surface 3 of the core 4. Preferably, the rod 1 is made of the same material as the core 4. As shown in the drawing, the diameter of the rod 1 can be slightly smaller than, or substantially equal to, the inner diameter of the fiber contact 8. Preferably, the end surface 2 of the rod 1 is provided with an anti-reflex coating for the wavelengths at which the fiber cable is to be used, for example, 1064 nm.

At a suitable distance from the rod 1, for example, at a distance of from about 5 mm to about 50 mm, a reflector 7, preferably partly absorbing, is arranged to conduct rays outside the fiber out towards an area 6 which is surrounded by a heat-abducting device 10 with cooling fins 11. The device 10 may, for instance, be made of aluminium. To replace or supplement the cooling fins 11, a cooling jacket for water cooling (not shown) may be included in the device 10. The reflector 7 may, for instance, be made of copper or, to increase the absorption capacity, of stainless steel. A temperature sensor 13 is mounted on that part of the reflector 7 which does not constitute the reflecting surface proper. The sensor 13 may be connected to a device (not shown) which, at a predetermined temperature, trigger an alarm or quite simply turns off the radiation source (not shown).

In a part of the area between the rod 1 and the reflector 7, the cladding 9 is surrounded by a material, for example, in the form of a glass capillary 5, which is in optical contact with the cladding 9 and has a refractive index exceeding or equal to that of the cladding 9. Outside the fiber contact 8, the cladding 9 is provided with a protective covering 12 which may comprise one or more different layers of material, for example, one or more layers of silicone, nylon or any other suitable polymeric material. There is no need of any protective covering in the fiber contact 8 itself, since the fiber is not bent or subjected to other mechanical stresses there.

Preferably, the core 4 has a diameter of from about 100 μm to about 1400 μm, the cladding 9 has a thickness of from about 20 μm to about 500 μm, the rod 1 has a diameter of from about 2 mm to about 15 mm, and the capillary 5 has an outer diameter of from about 4 mm to about 15 mm. The rod 1 may have a length of from about 3 mm to about 30 mm, and the capillary 5 may have a length of from about 5 mm to about 100 mm. The distance between the rod 1 and the capillary 5 may be from 0 mm to about 100 mm, while the distance between the capillary 5 and the reflectors may be from about 1 mm to about 100 mm.

The illustrated device operates as follows. A ray A coming in towards the fiber core 4 at an angle not exceeding the numerical aperture is linked directly into the core 4 and transmitted in the fiber by total internal reflection between the core 4 and the cladding 9 in the same way as in conventional optical fibers. A ray B coming in towards the fiber end but not impinging upon the core 4 is linked into the cladding 9. When the ray B reaches the capillary 5, which is in optical contact with the cladding 9, it will be linked out from the cladding 9 to the capillary 5, and it is conducted, via the reflector 7, to the area 6 at the inside of the fiber contact 8 where it is absorbed. The heat generated is cooled off with the aid of the heat-abducting device 10 having cooling fins 11. A ray C which does not hit the fiber at all is transmitted straight inwards Towards the reflector 7, and it is conducted in the same way as the ray B. Some of the radiation impinging upon the reflector 7 is absorbed, resulting in 8 temperature increase recorded by the sensor 13. Since the temperature in the reflector increases rapidly if the power becomes too high, the alarm can be triggered well before any serious damage has been done.

In a conventional optical fiber cable, the rays B and C would eventually have reached the fiber covering, where they would have been absorbed during uncontrolled heat generation. If the device is to function as desired, the rod I has to be so designed that rays not linked into the fiber are conducted to the reflector g and not refracted in an uncontrolled manner when leaving the rod 1. This may, for instance, be achieved if the rod 1, as illustrated in the drawing, essentially has the shape of a cylinder whose circumferential surface is substantially parallel to the extent of the core 4 and the cladding 9 in the contact 8.

We claim:

1. An optical fiber cable for high power laser radiation transmission comprising:

a light absorbing area;

a fiber having a core and a cladding;

a rod provided at at least one of the ends of the fiber and fused to an end surface of the core, said rod being substantially cylindrical and having a diameter larger than that of the fiber;

a reflector provided at a distance from said rod along the fiber core for reflecting light entering outside the fiber core and through said rod to said light absorbing area; and a glass capillary surrounding said fiber and in optical contact with the cladding of the fiber and located between the reflector and the rod.

2. An optical fiber cable according to claim 1 wherein the circumferential surface of the rod is substantially parallel to the longitudinal extend of the fiber.

3. An optical fiber cable according to claim 1, wherein the reflector is partly absorbing.

4. An optical fiber cable according to claim 1, further including a temperature sensor provided in the vicinity of the reflector.

5. An optical fiber cable according to claim 1, further including a radiation-proof transmitting material whose refractive index is higher than, or substantially equal to, that of the cladding, said material being in optical contact with the cladding in a part of the area between the reflector and the rod at the short side of the core.

6. An optical fiber cable according to claim 1, wherein the rod at the contact end of the core is made of a material having substantially the same refractive index as the core and is in optical contact therewith.

7. An optical fiber cable according to claim 1, wherein the core and the rod at the contact end thereof are made of quartz glass.

8. A method for transmitting a high power laser radiation by an optical fiber cable including a core and a cladding, said method comprising the steps of:

a) fusing a substantially cylindrical rod having a diameter larger than that of the core to an end surface of the core at at least one of contact ends of the core;

b) providing a reflector at a distance from said rod along the fiber core, and c) providing a glass capillary around said fiber between the reflector and the rod;

d) reflecting light entering outside the fiber core and through the rod to a light absorbing area.

9. A method according to claim 8, wherein the core and the rod at the contact end thereof are made of quartz glass.

10. A method according to claim 8, comprising the further step of providing a temperature sensor in the vicinity of the reflector.

11. A method according to claim 8, wherein the rod at the contact end of the core is made of a material having substantially the same refractive index as the core and being in optical contact therewith.

* * * * *